United States Patent [19]

Sakata et al.

[11] Patent Number: 5,443,561
[45] Date of Patent: Aug. 22, 1995

[54] FUEL VAPOR DISCHARGE LIMITING DEVICE FOR FUEL TANK

[75] Inventors: Yoshiyasu Sakata; Mitsuo Sugiyama, both of Tochigi, Japan

[73] Assignee: Honda Giken Kogyo Kabushiki Kaisha, Tokyo, Japan

[21] Appl. No.: 213,970

[22] Filed: Mar. 16, 1994

[30] Foreign Application Priority Data

Apr. 9, 1993 [JP] Japan .................................. 5-105922

[51] Int. Cl.⁶ .............................................. F16K 31/18
[52] U.S. Cl. ..................................... 137/202; 137/43; 137/587
[58] Field of Search .......................... 137/43, 202, 587

[56] References Cited

U.S. PATENT DOCUMENTS 4,781,218  11/1988  Mori et al. ........................ 137/202
5,313,978  5/1994   Takaki et al. ...................... 137/43

Primary Examiner—Gerald A. Michalsky
Attorney, Agent, or Firm—Armstrong, Westerman, Hattori, McLeland & Naughton

[57] ABSTRACT

A fuel vapor discharge limiting device for limiting communication between a fuel tank and a fuel vapor discharge pipe for discharging a fuel vapor in the fuel tank. The fuel vapor discharge limiting device includes a first float valve for cutting off the communication between the fuel tank and the fuel vapor discharge pipe when a liquid level in the fuel tank rises near a predetermined full level; a relief valve for allowing the communication between the fuel tank and the fuel vapor discharge pipe when an internal pressure in the fuel tank becomes not less than a predetermined value; and a second float valve for blocking the communication allowed by the relief valve when the liquid level in the fuel tank abnormally rises over the predetermined full level. Accordingly, oversupply of liquid fuel to the fuel tank can be prevented, and the internal pressure in the fuel tank can be maintained always within a predetermined permissible range. Furthermore, discharge of the liquid fuel to the fuel vapor discharge pipe can be prevented.

7 Claims, 4 Drawing Sheets

FUEL VAPOR DISCHARGE LIMITING DEVICE FOR FUEL TANK

BACKGROUND OF THE INVENTION

The present invention relates to a fuel tank for an automobile, and more particularly to a fuel vapor discharge limiting device for limiting the communication between a fuel tank and a fuel vapor discharge pipe for discharging a fuel vapor in the fuel tank.

An automobile fuel tank is usually provided with a fuel vapor discharge pipe opening into an upper portion of the fuel tank. A fuel vapor in the fuel tank is introduced through the discharge pipe to a canister, and is adsorbed by the canister. In operating an engine, the fuel vapor thus adsorbed is separated from the canister by an intake vacuum of the engine, and is purged into an intake mixture gas.

As described in Japanese Utility Model Laid-open Publication No. 57-9615, for example, a float type discharge limiting valve is provided at an opening portion of the fuel vapor discharge pipe opening into the fuel tank. The float type discharge limiting valve is vertically moved in response to a change in liquid level in the fuel tank to close the opening portion of the discharge pipe when the liquid level is near a predetermined level. In supplying liquid fuel into the fuel tank, the communication between the fuel tank and the discharge pipe is cut off by the limiting valve to raise an internal pressure in the fuel tank to a given value which makes oversupply of the liquid fuel impossible, thus limiting the liquid level in the fuel tank to the predetermined full level.

FIG. 1 shows an example of such a discharge limiting valve in the prior art. Referring to FIG. 1, reference numeral 01 denotes an upper wail of a fuel tank. The upper wail is formed with an opening in which a cylindrical case 02 is mounted through a packing 03. The case 02 has a closed upper end with which a fuel vapor discharge pipe 04 is integrally formed. The closed upper end of the case 02 is formed with a communication hole 05 through which the discharge pipe 04 communicates with the inside of the case 02. The case 02 has an open lower end to which a bottom plate 07 having a central communication hole 06 is mounted. The inside of the case 02 communicates with the inside of the fuel tank through the communication hole 06.

A float 08 is accommodated in the case 02. The float 08 is supported through a spring 09 to the bottom plate 07. The float 08 is normally upwardly biased by the spring 09 so that the weight of the float 08 balances a biasing force of the spring 09. A valve seat 010 is formed at an opening of the communication hole 05 on the case 02 side, and a valve member 011 projects from an upper surface of the float 08 so as to be opposed to the valve seat 010.

When a liquid level in the fuel tank rises to come near a predetermined full level in supplying liquid fuel into the fuel tank, the liquid fuel enters the case 02 from the communication hole 06 to exert a buoyancy on the float 08. Accordingly, the float 08 is pushed up by the spring 09 until the valve member 011 of the float 08 comes into engagement with the valve seat 010. Thus, the communication hole 05 is closed by the valve member 011 of the float 08, so that an internal pressure in the fuel tank starts rising up to a given value as mentioned above, thus limiting the liquid level to the predetermined full level.

The internal pressure possibly rises according to various conditions such as an atmospheric temperature, fuel temperature, fuel property, and partial pressure of fuel vapor in the fuel tank. Such a rise in the internal pressure easily occurs especially when the liquid level in the fuel tank is the full level. In the prior art mentioned above, however, the communication hole 05 for making the communication between the fuel tank and the fuel vapor discharge pipe 04 is closed by the valve member 011 of the float 08 in the condition of the full level, and there is no means for releasing the increased internal pressure in this condition. Accordingly, there is a possibility that the internal pressure may excessively rise over a permissible value in the fuel tank. Further, there is another possibility that such a rise in the internal pressure may occur just after the fuel tank is filled to cause splash of the liquid fuel from a fuel filler inlet.

SUMMARY OF THE INVENTION

It is accordingly an object of the present invention to provide a fuel vapor discharge limiting device for a fuel tan which can prevent the oversupply of liquid fuel to the fuel tan such that the liquid level in the fuel tank rises over predetermined full level, and also can always maintain a internal pressure in the fuel tank not greater than predetermined permissible value.

It is another object of the present invention to provide a fuel vapor discharge limiting device for a fuel tank which can prevent the liquid fuel in the fuel tank from being discharged to the fuel vapor discharge pipe.

According to the present invention, there is provided a fuel vapor discharge limiting device for limiting communication between a fuel tank and a fuel vapor discharge pipe for discharging a fuel vapor in the fuel tank, the fuel vapor discharge limiting device comprising a first float valve for cutting off the communication between the fuel tank and the fuel vapor discharge pipe when a liquid level in the fuel tank rises near a predetermined full level; a relief valve for allowing the communication between the fuel tank and the fuel vapor discharge pipe when an internal pressure in the fuel tank becomes not less than a predetermined value; and a second float valve for blocking the communication allowed by the relief valve when the liquid level in the fuel tank abnormally rises over the predetermined full level.

In operation, when the liquid level in the fuel tank rises near the full level in supplying liquid fuel to the fuel tank, the first float valve is operated to cut off the communication between the fuel tank and the fuel vapor discharge pipe. Accordingly, the internal pressure in the fuel tank rises to thereby prevent the oversupply of the liquid fuel to the fuel tank.

When the internal pressure in the fuel tank exceeds the predetermined value, the relief valve is operated to allow the communication between the fuel tank and the fuel vapor discharge pipe, thereby always maintaining the internal pressure not greater than the predetermined value.

Further, when the liquid level in the fuel tank at a portion where the fuel vapor discharge limiting device is located abnormally rises over the full level in cornering, acceleration, deceleration, etc. of a vehicle, the second float valve is operated to block the communication allowed by the relief valve, thereby preventing the liquid fuel in the fuel tank from being discharged through the relief valve to the fuel vapor discharge pipe.

Other objects and features of the invention will be more fully understood from the following detailed description and appended claims when taken with the accompanying drawings.

DETAILED DESCRIPTION OF THE PREFERRED EMBODIMENTS

There will now be described some preferred embodiments of the present invention with reference to FIGS. 2 to 6.

Figure 1:
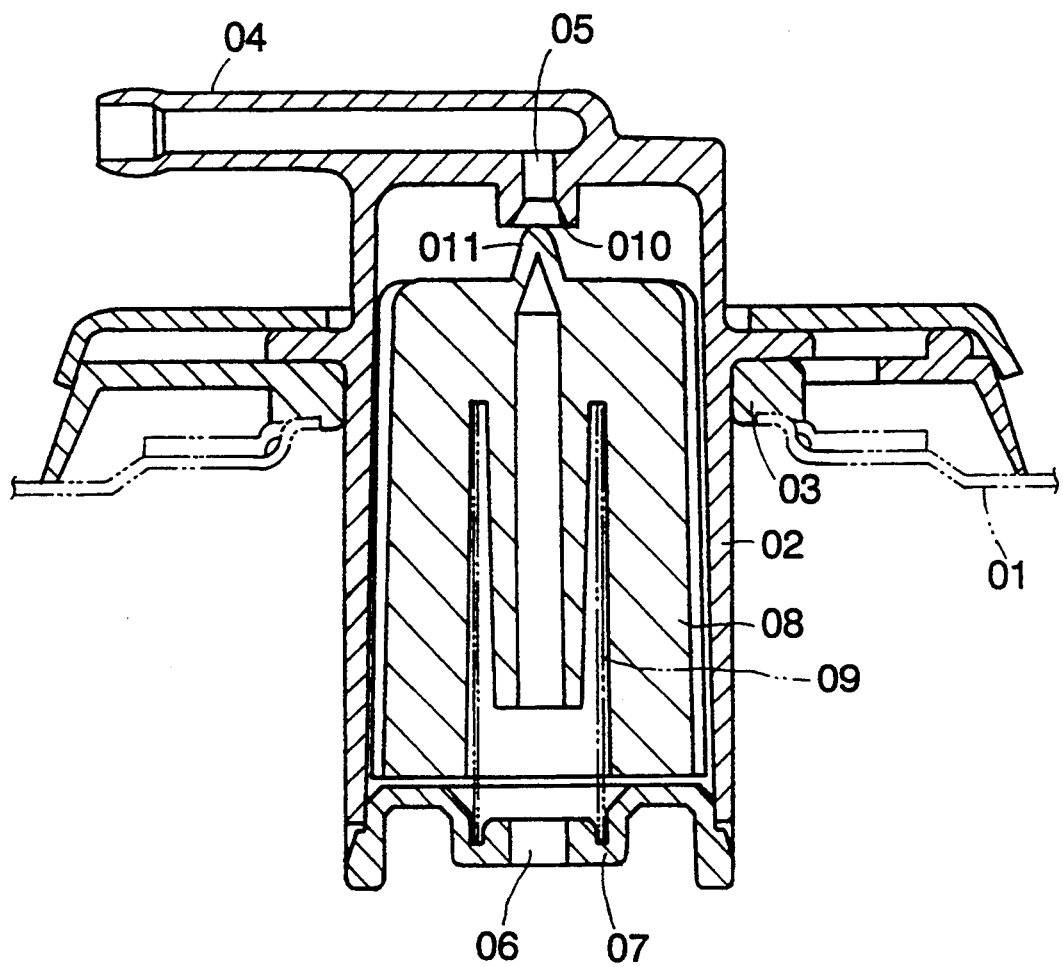
FIG. 1 is a sectional view of a fuel vapor discharge limiting device in the prior art.
Figure 2:
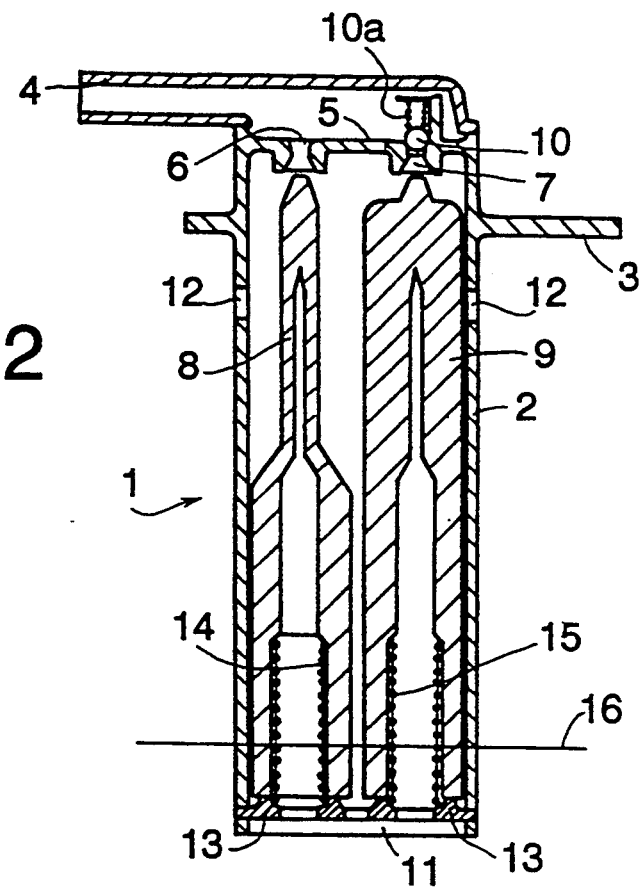
FIG. 2 is a sectional view of a fuel vapor discharge limiting device according to a first preferred embodiment of the present invention.

Referring first to FIG. 2, reference numeral 1 generally denotes a fuel vapor discharge limiting device according to a first preferred embodiment of the present invention. The fuel vapor discharge limiting device 1 has a case 2 similar to that shown in FIG. 1. The case 2 is formed with a flange 3 for mounting the limiting device 1 to a fuel tank (not shown). Thus, the limiting device 1 is mounted through the flange 3 to an upper portion of the fuel tank in a manner similar to that in FIG. 1 so that an upper portion of the limiting device 1 above the flange 3 is located outside the fuel tank, and a lower portion of the limiting device 1 below the flange 3 is located inside the fuel tank.

A fuel vapor discharge pipe 4 is integrally connected at one end thereof with an upper end of the case 2. The other end of the fuel vapor discharge pipe 4 is connected through a canister (not shown) to an air intake portion of an engine. The upper end of the case 2 is generally closed by an end plate 5 integrally formed therewith. The end plate 5 is formed with two communication holes 6 and 7 for making the discharge pipe 4 communicate with the case 2. A first float valve 8 and a second float valve 9 are provided in the case 2 so as to be opposed to the communication holes 6 and 7, respectively. Further, a relief valve 10 for closing the communication hole 7 from the discharge pipe 4 side is normally downwardly biased by a spring 10a.

The lower end of the case 2 is formed as an opening 11 through which the inside of the case 2 communicates with the inside of the fuel tank. A plurality of vent holes 12 are formed through a side wall of the case 2 at an upper portion thereof to communicate with a gas phase region in the fuel tank at an upper portion thereof.

The first and second float valves 8 and 9 are supported at their lower ends by a retainer 13 mounted at the opening 11 to the side wall of the case 2. The first and second float valves 8 and 9 extend vertically in parallel to each other in the case 2. A spring 14 is interposed between the first float valve 8 and the retainer 13 to normally upwardly bias the first float valve 8 so that a biasing force of the spring 14 balances the weight of the first float valve 8. Similarly, a spring 15 is interposed between the second float valve 9 and the retainer 13 to normally upwardly bias the second float valve 9 so that a biasing force of the spring 15 is equal to the biasing force of the spring 14. Both the float valves 8 and 9 are substantially cylindrical, and has the same density. A horizontal sectional area of a lower half portion of the first float valve 8 is equal to that of a lower half portion of the second float valve 9. An upper half portion of the second float valve 9 is equal in outer diameter to the lower half portion thereof, whereas an upper half portion of the first float valve 8 is smaller in outer diameter than the lower half portion thereof, accordingly, than the lower half portion of the second float valve 9. Thus, the volume of the first float valve 8 is smaller than that of the second float valve 9, so that the first float valve 8 is lighter in weight than the second float valve 9 because of the same density.

In operation, when liquid fuel is supplied to the fuel tank equipped with the fuel vapor discharge limiting device 1, gas in the fuel tank is discharged from the communication hole 6 to the fuel vapor discharge pipe 4 in accordance with a rise in level of the liquid fuel in the fuel tank during a time period where the liquid level is low. Accordingly, the supply of the liquid fuel smoothly proceeds. During this time period, the communication hole 7 is kept closed by the relief valve 10.

When the liquid level becomes near a full level 16 crossing the lower half portions of the float valves 8 and 9, a buoyancy is exerted on each of the float valves 8 and 9 by the liquid fuel entered the case 2 from the opening 11 with the result that the weights of the float valves 8 and 9 are reduced by the buoyancy. Since the horizontal sectional areas of the lower half portions of the float valves 8 and 9 are equal to each other, the buoyancy exerted on the float valve 8 is equal to that exerted on the float valve 9. As mentioned above, the first float valve 8 is lighter in weight than the second float valve 9. Accordingly, the biasing force of the spring 14 overcomes the weight of the first float valve 8 reduced by the buoyancy, thereby pushing up the first float valve 8 to close the communication hole 6. On the other hand, the weight of the second float valve 9 reduced by the buoyancy remains larger than the biasing force of the spring 15, so that the second float valve 9 is not pushed up by the spring 15 and accordingly not to close the communication hole 7. However, the relief valve 10 keeps closing the communication hole 7 as mentioned above.

Thus, when the communication between the inside of the case 2, that is, the inside of the fuel tank, and the fuel vapor discharge pipe 4 is cut off by the first float valve 8 in this manner, an internal pressure in the fuel tank starts rising. Thereafter, when the liquid level reaches the full level 16, the internal pressure becomes equal to a liquid head corresponding to the height of a fuel filler pipe (not shown), resulting in impossibility of further supply of the liquid fuel into the fuel tank. Thus, the liquid level in the fuel tank is limited to the predetermined full level 16, thereby preventing oversupply of the liquid fuel.

Even when the opening 11 of the case 2 formed at the lower end thereof is immersed in the liquid fuel, the inside of the case 2 is in communication with the gas phase in the fuel tank through the vent holes 12 of the case 2. Accordingly, when the internal pressure in the fuel tank rises according to various conditions such as an atmospheric temperature in the condition that the liquid level in the fuel tank is near the full level 16 and the communication hole 6 is closed by the first float valve 8, the relief valve 10 is operated by the increased internal pressure to open the communication hole 7 and discharge the gas in the fuel tank from the communication hole 7 to the fuel vapor discharge pipe 4. In this manner, the internal pressure in the fuel tank is maintained not greater than a predetermined permissible value depending upon a biasing force of the spring 10a of the relief valve 10.

In the case of cornering, acceleration, deceleration, etc. of a vehicle, the liquid level in the fuel tank at a portion where the limiting device 1 is located may abnormally rise over the full level 16. In this case, the first float valve 8 is raised to close the communication hole 6, of course. Furthermore, since the buoyancy exerted on the second float valve 9 increases, the second float valve 9 is also raised by the biasing force of the spring 15 to close the communication hole 7 regardless of the operation of the relief valve 10. Accordingly, there is no possibility that the liquid fuel in the fuel tank may discharge from the communication holes 6 and 7 to the fuel vapor discharge pipe 4 and flow into the canister. In the event that the vehicle rolls over, the float valves 8 and 9 are moved to the communication holes 6 and 7 by their respective own weights in addition to the biasing forces of the springs 14 and 15 to thereby close the communication holes 6 and 7, respectively. Thus, the discharge of the liquid fuel in the fuel tank from the communication holes 6 and 7 is securely prevented.

Figure 3:
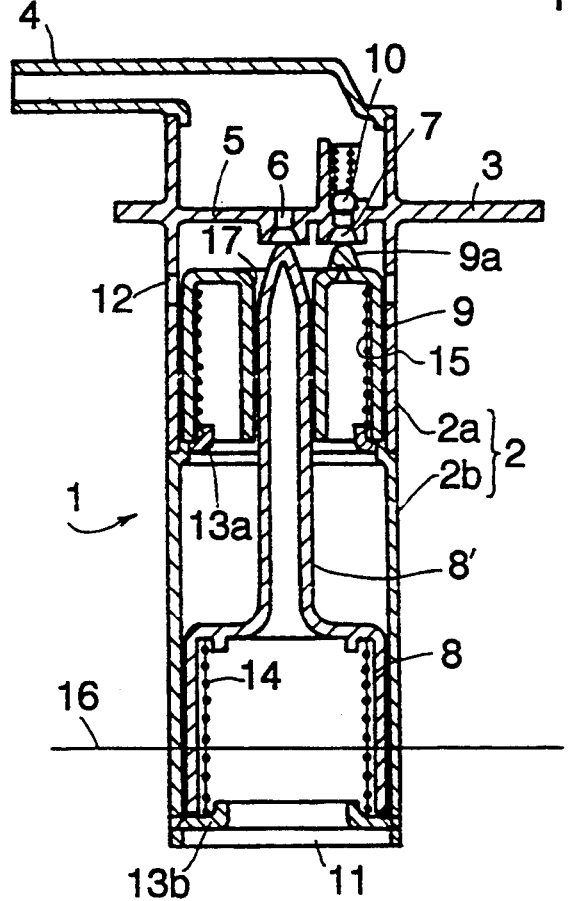
FIG. 3 is a sectional view of a fuel vapor discharge limiting device according to a second preferred embodiment of the present invention.
Figure 4:
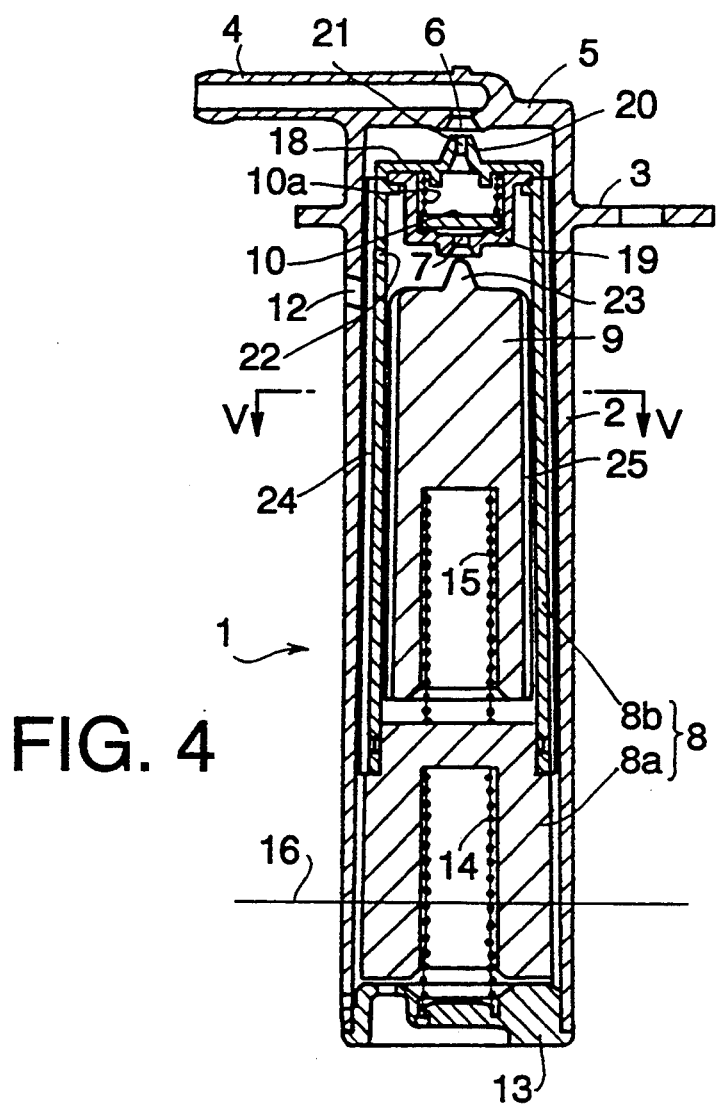
FIG. 4 is a sectional view of a fuel vapor discharge limiting device according to a third preferred embodiment of the present invention.
Figure 5:
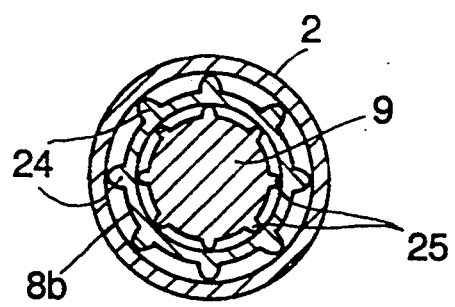
FIG. 5 is a cross section taken along the line V—V in FIG. 4.
Figure 6:
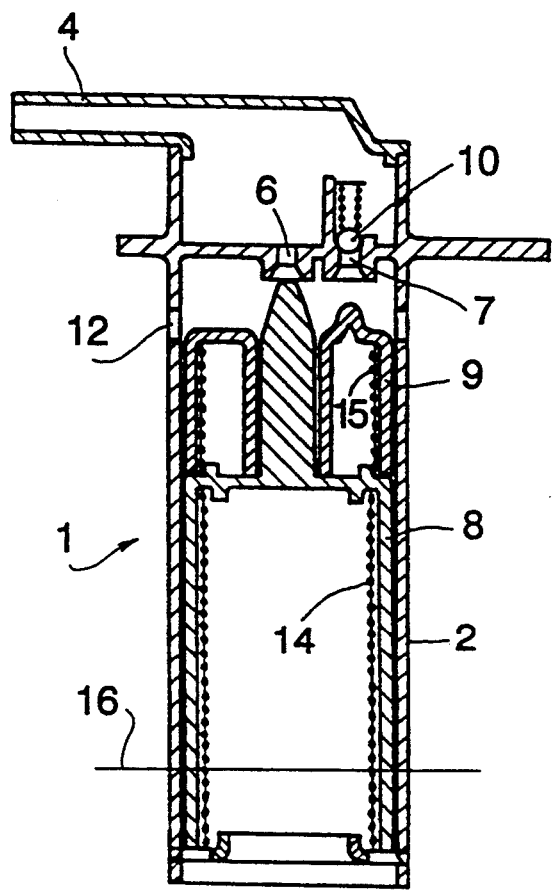
FIG. 6 is a sectional view of a fuel vapor discharge limiting device according to a fourth preferred embodiment of the present invention.

FIG. 3 shows a second preferred embodiment of the present invention; FIGS. 4 and 5 show a third preferred embodiment of the present invention; and FIG. 6 shows a fourth preferred embodiment of the present invention. In these drawings, the parts corresponding to those shown in FIG. 1 are denoted by the same reference numerals.

Referring to FIG. 3, reference numeral 1 generally denotes a fuel vapor discharge limiting device according to the second preferred embodiment. A case 2 of the limiting device 1 is generally composed of an upper part 2a and a lower part 2b connected together. The upper part 2a is formed with a flange 3 and an end plate 5. A retainer 13a is provided at a connecting portion between the upper part 2a and the lower part 2b. A second float valve 9 is supported on the retainer 13a through a spring 15. Another retainer 13b is provided at an opening 11 formed at the lower end of the case 2. A first float valve 8 is supported on the retainer 13b through a spring 14.

The second float valve 9 is formed as an annular body having a vertically extending, central through hole 17. The first float valve 8 has a small-diameter portion 8′ slidably inserted through the hole 17 and opposed to a communication hole 6 of the end plate 5. A projection 9a is formed on the upper end surface of the second float valve 9 so as to be opposed to a communication hole 7 of the end plate 5. In comparison with the first preferred embodiment shown in FIG. 2 wherein the first float valve 8 and the second float valve 9 are arranged horizontally in parallel to each other, the first float valve 8 and the second float valve 9 in the second preferred embodiment shown in FIG. 3 are arranged vertically in concentric relationship with each other. Accordingly, when the liquid level in the fuel tank is near a full level 16 crossing a lower portion of the first float valve 8, a buoyancy is exerted on the first float valve 8 only, but no buoyancy is exerted on the second float valve 9 located over the lower portion of the first float valve 8. When the liquid level rises to the level of the second float valve 9, a buoyancy is just exerted on the second float valve 9, thereby operating the second float valve 9 to close the communication hole 7.

Referring next to FIGS. 4 and 5, there is shown a fuel vapor discharge limiting device 1 according to the third preferred embodiment. A case 2 of the limiting device 1 in this preferred embodiment is an integral case similar to that in the first preferred embodiment shown in FIG. 2. However, an end plate 5 of the case 2 is formed at its central position with a communication hole 6 only. A first float valve 8 is composed of a thick-walled, cylindrical, lower part 8a and a thin-walled, cylindrical, upper part 8b connected together. A retainer 13 is provided at the lower end of the case 2. The lower part 8a is supported on the retainer 13 through a spring 14, and the upper part 8b is fixed at its lower end to the upper end of the lower part 8a over the outer circumference thereof to extend upwardly.

The upper part 8b of the first float valve 8 has an upper opening closed by a cover plate 18. A valve case 19 is located inside the upper part 8b at an upper end portion thereof in such a manner as to be tightly retained between the cover plate 18 and the upper part 8b. The cover plate 18 is formed at its central position with a projection 20 opposed to the communication hole 6 and adapted to engage the communication hole 6. Further, the projection 20 of the cover plate 18 is formed with a communication hole 21 aligned to the communication hole 6. The bottom of the valve case 19 is formed with a communication hole 7. A relief valve 10 for closing the communication hole 7 is provided in the valve case 19 so as to be normally downwardly biased by a spring 10a.

A plurality of vent holes 22 are formed through a side wall of the upper part 8b at an upper portion thereof, and a plurality of vent holes 12 are formed through a side wall of the case 2 at an upper portion thereof. Accordingly, the inside of the upper part 8b is always in communication with the gas phase in the fuel tank. A second float valve 9 is provided in the upper part 8b of the first float valve 8 so as to be supported through a spring 15 on the upper end surface of the lower part 8a of the first float valve 8. A projection 23 is formed on the upper end surface of the second float valve 9 so as to be opposed to the communication hole 7 of the valve case 19.

As shown in FIG. 5, a plurality of guide projections 24 are formed on the outer circumferential surface of the upper part 8b of the first float valve 8 so as to extend in a longitudinal direction thereof. The guide projections 24 of the first float valve 8 are in sliding contact with the inner circumferential surface of the case 2. Similarly, a plurality of guide projections 25 are formed on the outer circumferential surface of the second float valve 9 so as to extend in a longitudinal direction thereof. The guide projections 25 of the second float valve 9 are in sliding contact with the inner circumferential surface of the upper part 8b of the first float valve 8. Although not shown, such guide projections may be formed on the float valves 8 and 9 in the first and second preferred embodiments shown in FIGS. 2 and 3 and in the fourth preferred embodiment shown in FIG. 6.

In the third preferred embodiment, when the liquid level in the fuel tank is near a full level 16 crossing the lower part 8a of the first float valve 8, a buoyancy is exerted on the first float valve 8 only, but no buoyancy is exerted on the second float valve 9. Accordingly, the first float valve 8 is raised by a biasing force of the spring 14 to make the projection 20 close the communication hole 6. At this time, the second float valve 9 supported on the first float valve 8 is also raised, and no relative displacement between the second float valve 9 and the first float valve 8 occurs. Therefore, the communication hole 7 is not closed by the projection 23 of the second float valve 9. However, since the communication hole 7 is closed by the relief valve 10 from the inside of the valve case 19, the communication between the inside of the fuel tank and the fuel vapor discharge pipe 4 is cut off by the engagement between the communication hole 6 and the projection 20 of the first float valve 8. Accordingly, the internal pressure in the fuel tank starts rising.

When the internal pressure in the fuel tank exceeds a predetermined value depending upon a biasing force of the spring 10a, the relief valve 10 is opened to discharge the gas in the fuel tank through the vent holes 12 and 22 and the communication holes 7, 21 and 6 to the fuel vapor discharge pipe 4, thus maintaining the internal pressure not greater than the predetermined value. Further, when the liquid level in the fuel tank abnormally rises to the level of the second float valve 9 over the full level 16 upon cornering, etc., a buoyancy is exerted also on the second float valve 9. Accordingly, the second float valve 9 is raised by a biasing force of the spring 15, and is displaced relative to the first float valve 8 to close the communication hole 7, thereby securely preventing the discharge of the liquid fuel to the fuel vapor discharge pipe 4.

Referring next to FIG. 6, there is shown a fuel vapor discharge limiting device 1 according to the fourth preferred embodiment. In this preferred embodiment, the limiting device 1 has a structure such that the second float valve 9 supported through the retainer 13a to the upper part 2a of the case 2 in the second preferred embodiment shown in FIG. 3 is supported on the first float valve 8 as in the third preferred embodiment shown in FIG. 4. When the liquid level in the fuel tank becomes near a full level 16 crossing the first float valve 8, the first float valve 8 is raised by a biasing force of a spring 14, and the second float valve 9 is also raised with the first float valve 8. Accordingly, an upper projecting end of the first float valve 8 closes a communication hole 6. However, since an upper projecting end of the second float valve 9 is lower in level than the upper projecting end of the first float valve 8, the upper projecting end of the second float valve 9 does not close a communication hole 7 at this time. When the liquid level in the fuel tank abnormally rises to the level of the second float valve 9 over the full level 16 upon cornering, etc., a buoyancy is exerted also on the second float valve 9, so that the second float valve 9 is raised from the first float valve 8 by a biasing force of a spring 15 to close the communication hole 7.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A fuel vapor discharge limiting device for limiting communication between a fuel tank and a fuel vapor discharge pipe for discharging a fuel vapor in said fuel tank, said fuel vapor discharge limiting device comprising:

a first float valve means for cutting off the communication between said fuel tank and said fuel vapor discharge pipe when a liquid level in said fuel tank rises near a predetermined full level;

a relief valve means for allowing the communication between said fuel tank and said fuel vapor discharge pipe when an internal pressure in said fuel tank becomes not less than a predetermined value; and a second float valve means for blocking the communication allowed by said relief valve when the liquid level in said fuel tank abnormally rises over said predetermined full level.

2. A fuel vapor discharge limiting device according to claim 1, wherein:

said fuel vapor discharge pipe communicates with said fuel tank through a first communication hole adapted to be closed by said first float valve and a second communication hole adapted to be closed by said second float valve; and said relief valve is located at said second communication hole so as to normally close said second communication hole while the internal pressure in said fuel tank is less than said predetermined value.

3. A fuel vapor discharge limiting device according to claim 2, wherein said first and second float valves are arranged in parallel to each other so as to be opposed to said first and second communication holes, respectively.

4. A fuel vapor discharge limiting device according to claim 2, wherein said second float valve is annularly configured to have a central hole, and is arranged over said first float valve, said first float valve having a small-diameter portion slidably inserted through said central hole of said second float valve and opposed to said first communication hole.

5. A fuel vapor discharge limiting device according to claim 4, wherein said first and second float valves are supported independently of each other.

6. A fuel vapor discharge limiting device according to claim 4, wherein said second float valve is placed on said first float valve.

7. A fuel vapor discharge limiting device according to claim 1, wherein:

said fuel vapor discharge pipe communicates with said fuel tank through a first communication hole adapted to be closed by said first float valve;

said first float valve has a thin-walled, cylindrical, upper part having an upper opening end, a cover plate covering said upper opening end of said upper part, a projection formed on said cover plate and adapted to engage said first communication hole, a second communication hole formed through said projection for comunicating with said first communication hole, a valve case mounted adjacent to said cover plate in said upper part and communicating with said second communication hole, and a third communication hole formed through a bottom of said valve case and communicating with inside of said upper part;

said relief valve is provided in said valve case so as to normally close said third communication hole while the internal pressure in said fuel tank is less than said predetermined value; and said second float valve is provided in said upper part of said first float valve so as to close said third communication hole when the liquid level in said fuel tank abnormally rises over said predetermined full level.

* * * * *